UNITED STATES PATENT OFFICE.

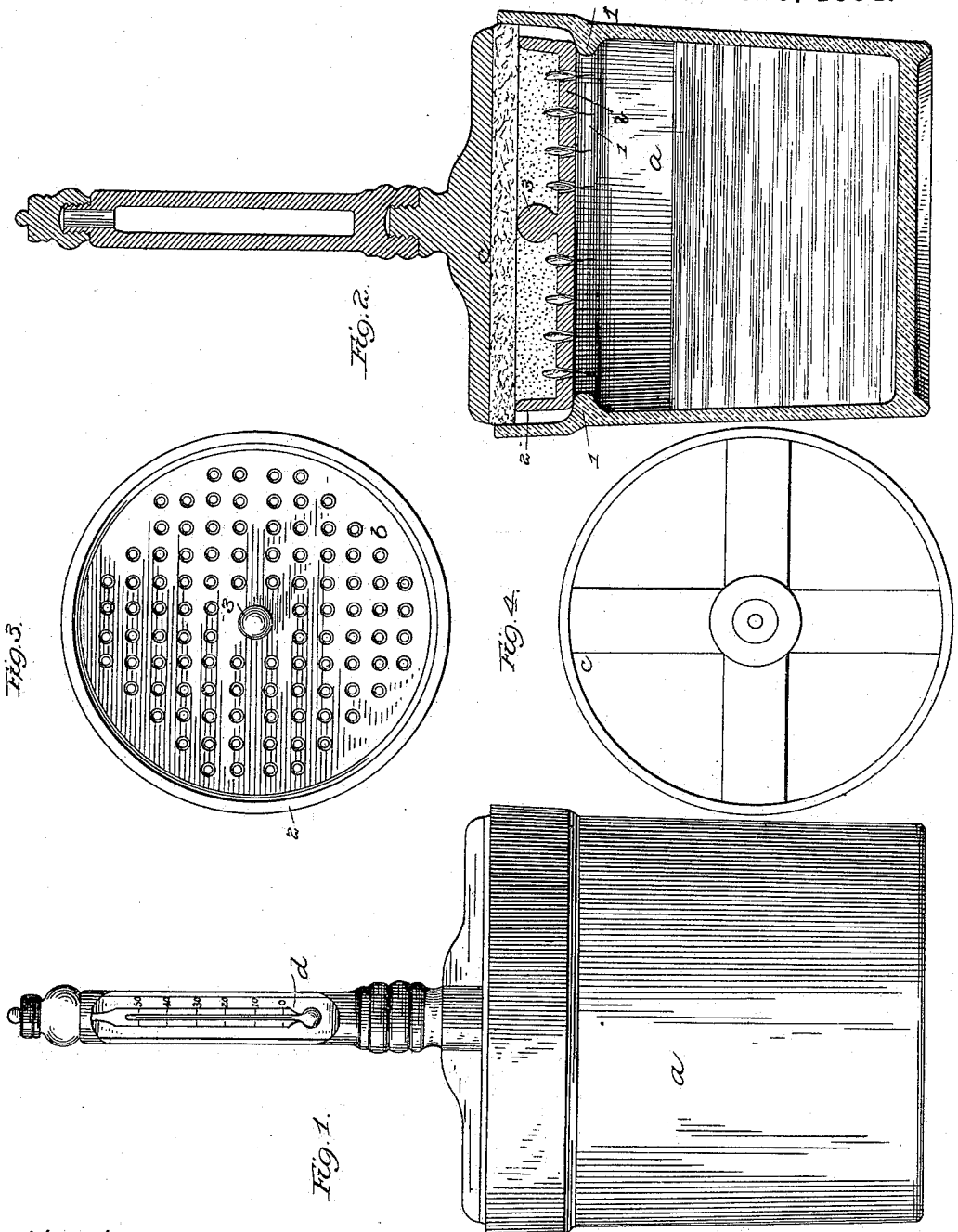

OTTO COLDEWE AND LOUIS SCHONJAHN, OF BRUNSWICK, GERMANY.

GERMINATING APPARATUS.

SPECIFICATION forming part of Letters Patent No. 309,132, dated December 9, 1884.

Application filed January 29, 1884. (No model.)

*To all whom it may concern:*

Be it known that we, OTTO COLDEWE and LOUIS SCHONJAHN, of Brunswick, Germany, have invented a new and useful Improvement in Germinating Apparatus; and we do hereby declare that the following is a full, clear, and exact description of the same.

Our invention is an improved germinating apparatus for the purpose of investigating the germinating capacity of seeds and grains. The apparatus heretofore employed for this purpose have been more or less defective, for the reason that the seeds have not been equally exposed to moisture or germinating influences, and therefore inequality of development has occurred. By our apparatus we obviate these difficulties and disadvantages, and assure the regular germination of the seeds and grains by constant and regular presence or supply of vapor or steam.

An apparatus embodying our invention is illustrated in the accompanying drawings, in which—

Figure 1 represents a side elevation, and Fig. 2 a central vertical section, of the apparatus. Fig. 3 is a top view of the perforated diaphragm. Fig. 4 is a top view of the apparatus.

In the drawings the receptacle is indicated at *a*, and may be of any suitable size and form adapted to contain water. It is formed or provided with a ledge, 1, or equivalent means for sustaining a perforated diaphragm, *b*. This, as shown, is formed with an upturned flange, 2, and a central knob or handle, 3. The holes of the perforated diaphragm are enlarged above, as shown, to receive the body of the grain, the end of which containing the germ projecting through or reaching the bottom of the perforation, where it is supported by the shape of the hole. When made in the shape shown, the diaphragm may be made of porous earthenware; but for smaller seeds a sieve of wire may be used for this purpose. The grains must always lie in the perforations or meshes with the germinating end downward. The receptacle is supplied with water to about three-fourths the height of the supporting-ledge 1, the diaphragm is set, the seeds or grains are put in position therein, and the seed covered with dry sand to the brim of the diaphragm. This sand is moistened from the top, and then the cover *c* is placed over the diaphragm, resting upon the upturned flange 2. This cover is provided with a covering of felt upon its bottom, which prevents the escape of moisture or vapor, as it is kept pressed tightly against the sand by the weight of the cover. The cover is also provided with a thermometer, *d*, by which any desired temperature may be established, according to the length of time desired to germinate the seeds. The vapor or steam arising from the water is diffused uniformly to the seeds and reaches equally all the germinating ends, and these parts are advanced regularly and much more rapidly than heretofore, only about one-half the time being required of that necessary in devices heretofore employed.

We do not desire to be understood as limiting ourselves to the precise form of apparatus shown, as this may be varied greatly without departing from the spirit of our invention.

We claim as our invention—

1. An apparatus for germinating seeds or grains, consisting of a receptacle for water, a diaphragm supported within said receptacle and provided with perforations adapted to receive and hold the seeds or grains, and a suitable cover, substantially as described.

2. The combination of the receptacle *a*, having the ledge 1, the perforated diaphragm *b*, and the cover *c*, all substantially as described.

3. The combination of the receptacle *a*, having ledge 1, the perforated diaphragm *b*, and felt-lined cover, all substantially as described.

4. The combination of the receptacle, the ledge 1, and perforated diaphragm *b*, of porous earthenware, and a suitable cover, all substantially as described.

In testimony whereof we have signed our names to this specification in the presence of two subscribing witnesses.

OTTO COLDEWE.
LOUIS SCHONJAHN.

Witnesses:
WILLIAMS C. FOX,
JOS. KRACKE.